T. L. VALERIUS.
MIXING MACHINE.
APPLICATION FILED JAN. 20, 1911.
1,160,217.
Patented Nov. 16, 1915.
2 SHEETS—SHEET 2.
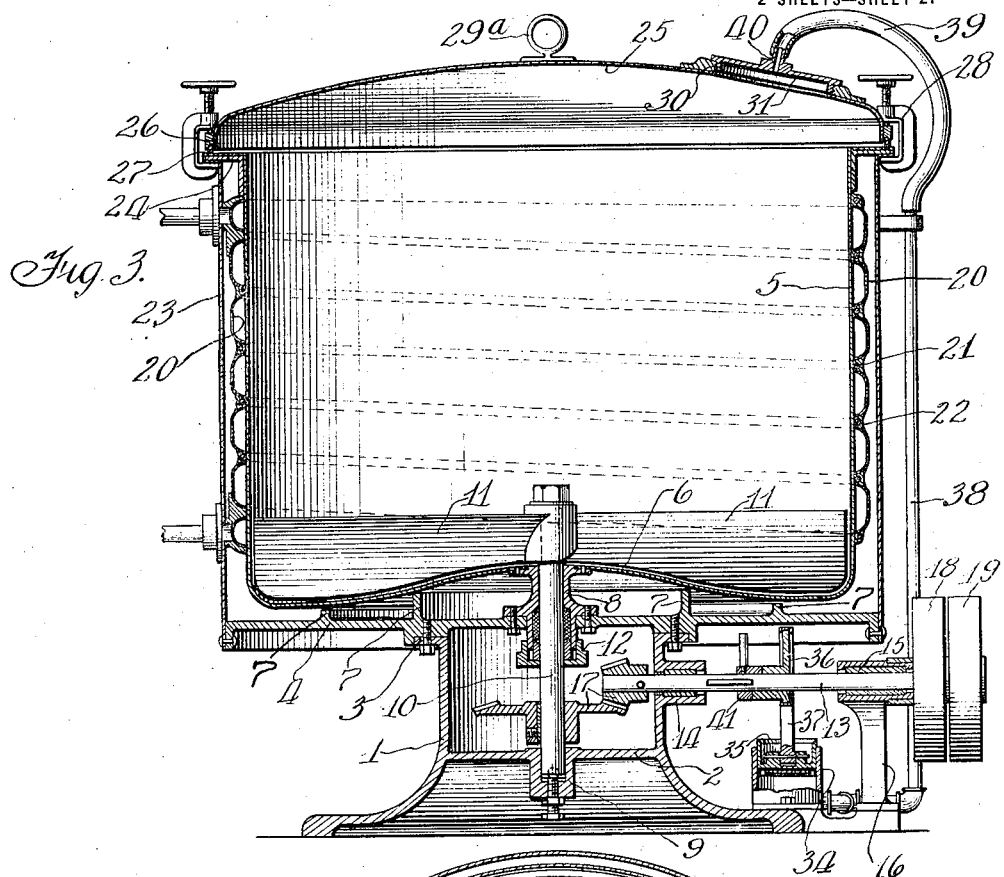
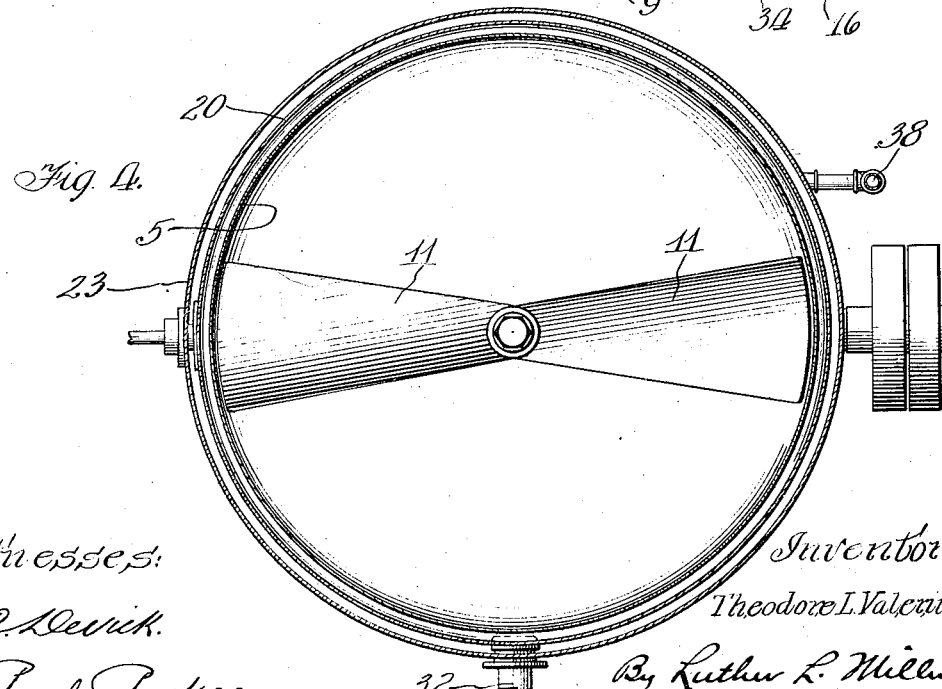
Witnesses:
J. C. Devick.
C. Paul Parker.
Inventor:
Theodore L. Valerius,
By Luther L. Miller
Atty.

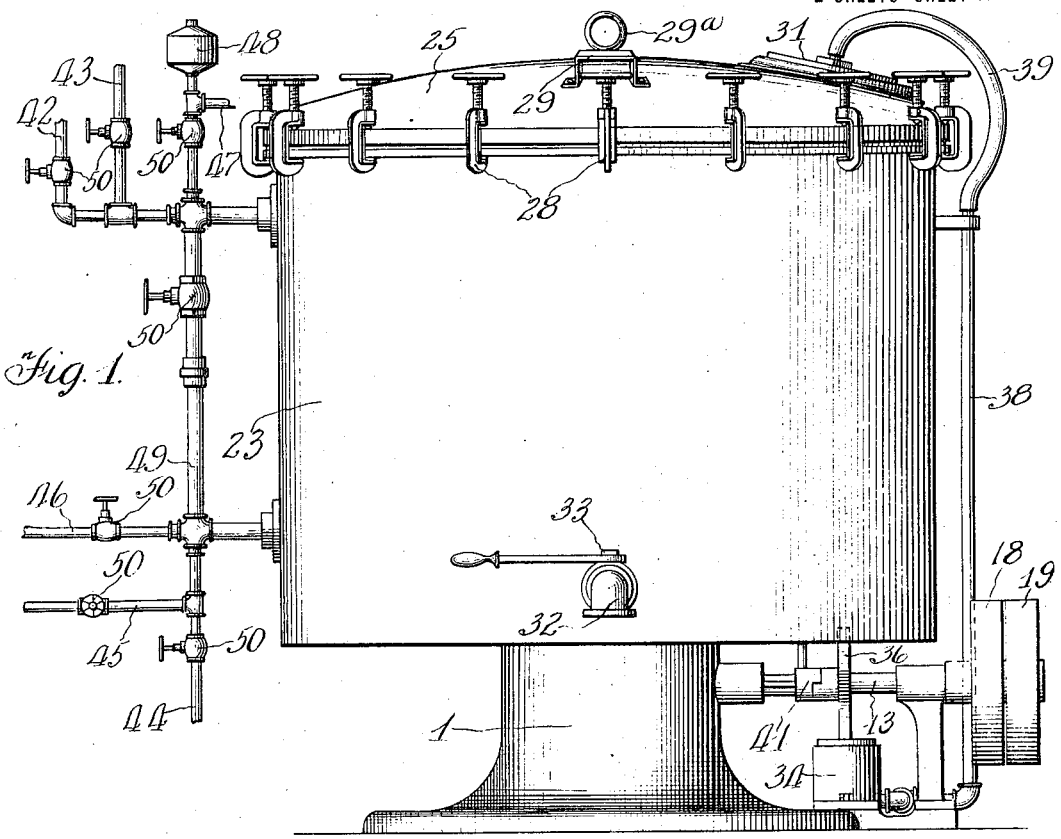
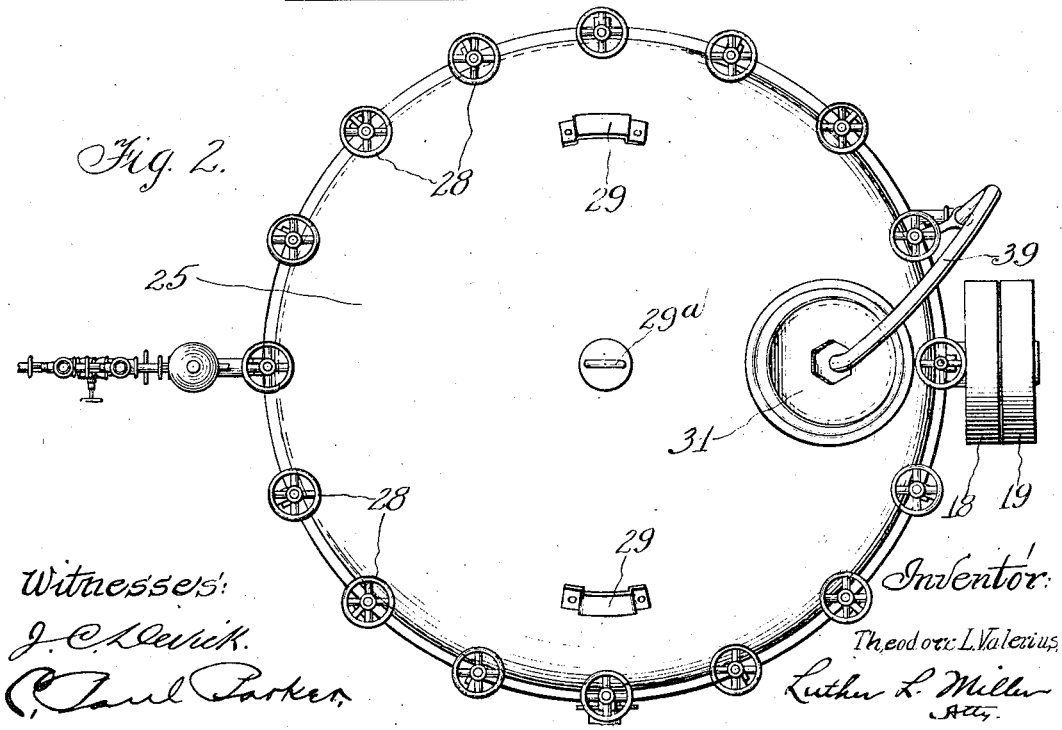

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

MIXING-MACHINE.

1,160,217.  Specification of Letters Patent.  Patented Nov. 16, 1915.

Application filed January 20, 1911. Serial No. 603,618.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Mixing-Machines, of which the following is a specification.

The object of this invention, generally stated is to produce a simple and efficient machine for mixing together the ingredients of ice cream and heating or cooling the same as desired.

Special objects are to improve the means for securing the heating or cooling coil to the tank; and to provide means for discharging the contents of the tank by the use of compressed air.

While the present machine is particularly intended for mixing ice cream, it will be understood that it may be easily adapted, with perhaps slight changes, for various analogous uses and I do not limit the machine to the use herein described.

In the accompanying drawings, Figure 1 is an elevation of a machine embodying the features of my invention. Fig. 2 is a plan view thereof. Fig. 3 is a vertical central section through the machine and Fig. 4 is a horizontal section.

The present embodiment of the invention comprises a base 1 in the form of a hollow pedestal having a web 2 therein and an annular flange 3 at its upper end upon which is supported a base-plate 4. A tank 5, preferably having cylindrical side walls, is supported by the base-plate 4, the bottom wall 6 of said tank being inclined upwardly from all sides toward the center of the tank, said bottom wall resting upon annular flanges 7 upon the upper side of the base-plate 4. A bearing member 8 is positioned between and secured to the base-plate 4 and the bottom wall 6 of the tank 5. Rotatably mounted in said bearing-member and in a step-bearing 9 upon the web 2 is a vertical shaft 10 to the upper end of which is fixed an agitator of any suitable form, as, for example, a plurality of mixing or agitating blades 11. The lower edges of the blades 11 conform to the shape of the bottom of the tank. Any solids, as for example, sugar, in the material within the tank 5 will gravitate to the bottom of the tank and owing to the shape of said bottom will gravitate toward the outer edge thereof so that a much more thorough mixing of materials is had. A stuffing box 12 comprised in the bearing-member 8 prevents leakage from the tank 5 along the shaft 10.

The agitator shaft 10 is rotated by means of the horizontal shaft 13 mounted in a bearing 14 upon the base 1 and in a bearing 15 carried by bracket 16. Upon the shafts 10 and 13, within the pedestal 1 are fixed intermeshing gears 17. The outer end of the shaft 13 carries a tight pulley 18 and a loose pulley 19.

About the exterior of the tank 5 is helically coiled a channel 20, said channel having its open side adjacent to the tank 5 and the wall of said tank closing said open side. The channel 20 may be secured to the tank 5 by means of a wire 21 coiled about the tank 5 between the adjacent laps of said channel, solder 22 being flushed about said wire to fill the space between adjacent laps of the channel. The solder forms a fluid tight joint between the channel 20 and the tank 5.

An outer shell or jacket 23 surrounding the tank 5 has its lower edge secured to the periphery of the base-plate 4, the upper edge of said shell being suitably secured to a rim 24 of angle iron, which rim is fixed upon the upper end of the tank 5. The cover 25 for the tank has a rim 26 of band iron at its edge, said rim carrying a gasket 27, adapted to bear upon the rim 24 to provide a fluid-tight joint between the cover and the tank 5. Any suitable means may be provided for securing the cover 25 to the tank. Herein I have shown a plurality of clamps 28 engaging the rims 24 and 26 and adapted to draw the cover 25 into fluid-tight contact with the tank.

29 are handles for raising the cover 25 and 29ª is a suspending ring.

Material is introduced into the tank 5 through an opening 30 in the cover 25, said opening being closed by means of a closure 31 screw threaded into the cover 25.

32 is an outlet from the tank 5 which is controlled by a suitable valve 33. The outlet 32 may, if desired, be formed for the convenient attachment of a hose (not shown). It will be noted that said outlet is in the side of the tank 5 so that the outlet will not become clogged as it would if in the bottom of the tank.

It is sometimes desirable to transmit material from the tank 5 directly to another receptacle, as, for instance an ice cream freezer. Means is therefore provided for forcing material from the tank 5, said means comprising in this instance, an air pump 34 having a piston 35 therein, arranged to be driven by suitable means such as an eccentric 36 on the shaft 13 and a link 37 connecting the strap of said eccentric with the piston 35. A pipe 38 leads upwardly from the pump 34 and to the upper end of said pipe is secured one end of a flexible conductor 39, the other end of said conductor being secured to a hollow nipple 40 upon the cover 31. A clutch 41 slidable upon the shaft 13 is arranged to engage the eccentric 36 for connecting and disconnecting it from said shaft 13.

A heating or cooling medium may be introduced into the helical channel 20 through any suitable arrangement of pipes. I have herein shown a water-inlet pipe 42 and a brine-inlet pipe 43 communicating with the upper end of the coil 20, the water or brine finding an outlet from the lower end of said coil through pipes 44 and 45 respectively. If desired, steam may be supplied to the lower end of the coil 20 through a pipe 46. Communicating with the upper end of said coil is an overflow pipe 47. 48 is a vent can through which the water vapors escape. 49 is a pipe connecting the upper and lower ends of the coil 20 outside of the tank. Each of the above mentioned pipes has a valve 50 therein.

In the operation of the machine, materials to form ice-cream custard, for example, are introduced into the tank 5 through the opening 30 in the cover 25, the materials being thoroughly mixed together by the agitator blades 11. Should it be desired to heat the material for the purpose of cooking or sterilizing it, the valve 50 in the steam pipe 46 is opened to admit steam to the coil 20 so as to heat the tank 5. After the material has been heated to the desired degree, the steam may be shut off and cold water from the pipe 42 admitted to the coil 20 to cool the material in the tank 5. If it be desired to cool the material further than is possible by the use of cold water, brine may be admitted to the coil from the pipe 43.

It will be understood that either of the heating or cooling means herein described may, if desired, be used alone in connection with a machine embodying my invention, or one machine may be used for cooking or sterilizing and another for cooling, preparatory to the freezing operation.

If it be desired to force the material from the tank 5 to another receptacle such as an ice cream freezer, the operator slides the clutch 41 along its shaft 13 to lock the eccentric 36 to said shaft so that the pump 34 will be operated and deliver air to the upper portion of the tank 5. The valve 33 then being opened, the material will be forced from the tank 5 through a suitable conductor (not shown) to the ice cream freezer or other receptacle.

I have herein described an embodiment of my invention in considerable detail without intending thereby to limit the scope of the appended claims.

I claim as my invention:

1. An ice-cream custard mixer comprising a tank, a removable cover for the upper end of the tank, said cover having a filling opening therein, a closure for said opening, said closure having an air inlet opening therein, and an air supply pipe detachably connected to said closure in communication with said inlet opening.

2. An ice-cream custard mixer comprising a tank, the bottom wall of which is higher at the center than at the circumference, a vertical shaft projecting centrally through said bottom wall, means for driving said shaft, an agitator blade secured to said shaft, the lower edge of said blade being curved to conform to and lie relatively close to the bottom wall, and a drain outlet in the side wall of the tank adjacent to the depressed peripheral portion of the bottom wall.

In testimony whereof I affix my signature in the presence of two witnesses.

THEODORE L. VALERIUS.

Witnesses:
L. L. MILLER,
C. PAUL PARKER.